Figure 1:
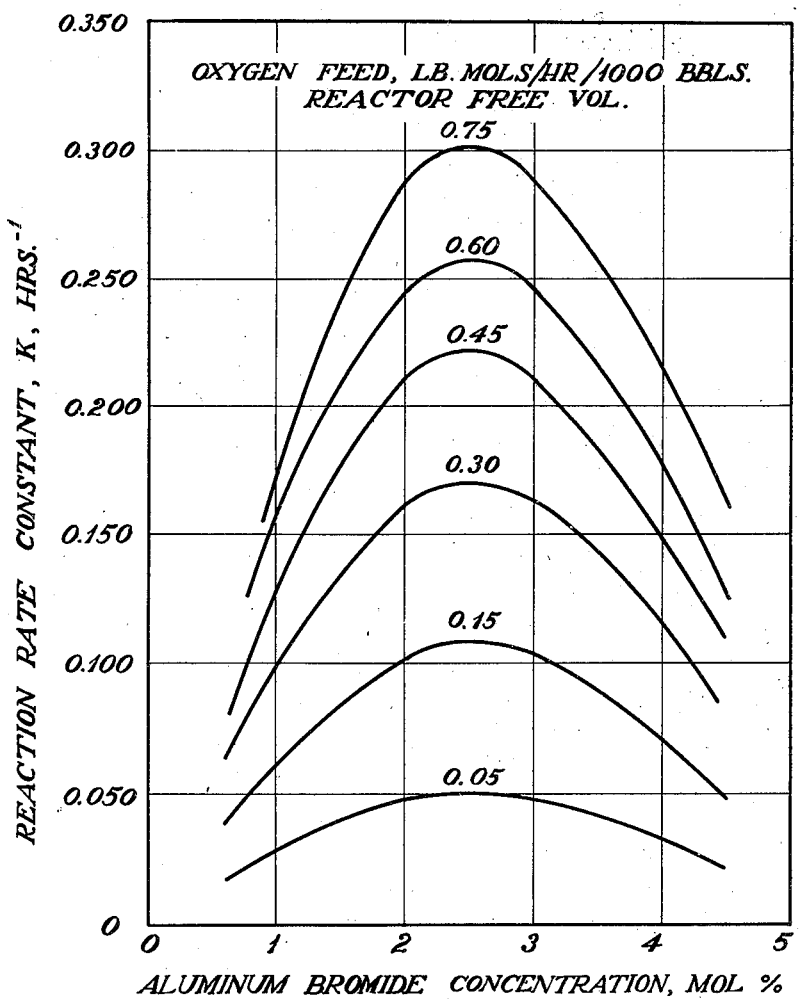

Patented June 17, 1947

2,422,346

UNITED STATES PATENT OFFICE 2,422,346

ISOMERIZATION PROCESS

Gerald L. Farrar, Dallas, Tex., assignor, by mesne assignments, to Socony-Vacuum Oil Company, Incorporated, New York, N. Y., a corporation of New York Application October 23, 1944, Serial No. 559,921

9 Claims. (Cl. 260—683.5)

This invention relates to the isomerization of normal butane to isobutane. Specifically this invention is concerned with a process for converting normal butane to isobutane involving the use of aluminum bromide promoted by oxygen as a catalyst for the conversion. More particularly the invention concerns the use of optimum concentrations of the aluminum bromide catalyst when operating the isomerization process within a preferred range of conditions with respect to temperature and concentration of oxygen promoter.

It is known to isomerize normal butane to isobutane in the presence of aluminum halides such as aluminum chloride and aluminum bromide. It is also known that these catalysts require promoters such as hydrogen halides, alkyl halides and free halogens in order to accelerate the reaction to rate levels which are consistent with economic commercial operation. The use of oxygen as a promoter for activating aluminum bromide catalyst for the isomerization of normal butane to isobutane is taught and claimed in the co-pending application of Alex G. Oblad, Edwin M. Irish and Manuel H. Gorin, entitled Hydrocarbon conversion process, Serial 513,180, filed December 6, 1943.

The object of the present invention is to provide an improved process for aluminum bromide isomerization of normal butane by accelerating the reaction rate. Another object is to accelerate the reaction rate by means of oxygen promoter for the aluminum bromide catalyst. A more specific object of the invention is to correlate the amount of aluminum bromide catalyst added to a continuous oxygen promoted aluminum bromide butane isomerization process with the temperature employed in such process and with the amount of oxygen added to such process thereby obtaining the optimum conversion per pass with a minimum consumption of catalyst and minimum production of butane decomposition products. Still another object of the invention is to obtain a maximum increase of the reaction rate in normal butane isomerization without resorting to excessive temperature and excessive use of catalyst promoter. These and other objects will become apparent from the description of the invention which follows.

Butane isomerization using oxygen promoted aluminum bromide catalyst is a unimolecular first order reaction. Thus the isobutane concentration in the feed and residence time in the reactor have no effect on the reaction rate and the reaction rate for the continuous process may be calculated from the equation $$K = \frac{(Ff - Fe)}{(Fe)(\theta)}$$

where $K$ = First order reaction rate constant expressed in units per hour,
$Ff$ = Reactor feed driving force, i. e., equilibrium percent iso $C_4$ minus percent iso $C_4$ in the reactor feed,
$Fe$ = Reactor driving force, that is, equilibrium percent iso $C_4$ minus percent iso $C_4$ in the reactor, and
$\theta$ = Residence time or time of hydrocarbon contact in the reactor expressed in hours.

Operating variables in my continuous process which effect the value of $K$ in the above equation are temperature, concentration of the aluminum bromide catalyst, amount of oxygen used to activate the catalyst and intimacy of contact of the oxygen with the hydrocarbon solution of the promoted aluminum bromide catalyst. Generally speaking the higher the operating value of $K$ the more efficient will be the process particularly with respect to capacity of a given unit. However, other factors such as catalyst consumption and availability of facilities for recovering the catalyst, the requirement for relatively high pressure equipment when operating in the higher temperature ranges and other operating costs should be considered in determining the rate constant for most efficient operation of a continuous process using oxygen activated aluminum bromide catalyst.

The effect of increasing the temperature on the reaction rate when operating in the presence of oxygen activator for the catalyst is most marked in the range of from about 170° F. to about 200° F. and becomes less at higher temperatures with best results obtained at about 225° F. While higher temperatures up to the critical temperatures of the reactants, i. e., about 300° F. may be used, I prefer to operate at temperatures within the range of from about 210° F. to about 240° F. and thereby avoid the use of the higher pressure equipment. Operation at temperatures above about 250° F. tends to promote cracking and the production of an increased amount of hydrocarbons boiling above and below the boiling range of the butane fraction. This is undesirable where the process is primarily concerned with the manufacture of isobutane from normal butane by the utilization of a soluble catalyst.

The amount of oxygen required to promote aluminum bromide catalyst for butane isomerization is relatively small. If oxygen is added in appreciable quantity, relatively large amounts of aluminum bromide catalyst are consumed and hence all excess above the absolute requirement is to be avoided. I have found that the amount of oxygen required is closely related to the free reaction space, that is, the volume of the reactor taken up by the reacting liquid butane or in other words the total volume of the reactor minus the volume occupied by the packing material. When operating my process under conditions where catalyst recovery facilities are not sufficient to recover consumed catalyst efficiently, the amount of oxygen addition will lie within the range of from about 0.005 to about 0.2 pound mols of oxygen per hour per thousand barrels of free reactor space. Larger amounts of oxygen up to 2.0 pound mols per hour per thousand barrels of free reactor space may be used where the economics of catalyst recovery are sufficiently favorable to justify the increased catalyst consumption resulting from greater use of oxygen in order to obtain a high reaction rate.

A third factor influencing the value of the reaction rate constant K in the above relationship is that of aluminum bromide concentration in the reactor. I have found that there is an optimum range of catalyst concentration in the normal butane reactant to obtain maximum reaction rate which optimum is independent of the amount of oxygen promoter used and also independent of the temperature of operation over the operating range contemplated by my process. In Figure 1 plots of reaction rate K values versus mol percent concentration of aluminum bromide catalyst are shown for oxygen addition values within the above specified ranges. The temperature of operation used in obtaining data from which Figure 1 is plotted was 225° F. Data obtained at other temperatures within the above broad range of 170° to 300° F. indicate that the optimum is approximately the same for the entire temperature range of operation, particularly the preferred temperature range of 210° F. to 240° F. The optimum catalyst concentration is from about 2.1 mol percent to about 2.85 mol percent of aluminum bromide in the reactants and I prefer to operate my process to maintain this concentration of aluminum bromide catalyst in the reactants in the reaction zone.

Figure 2:
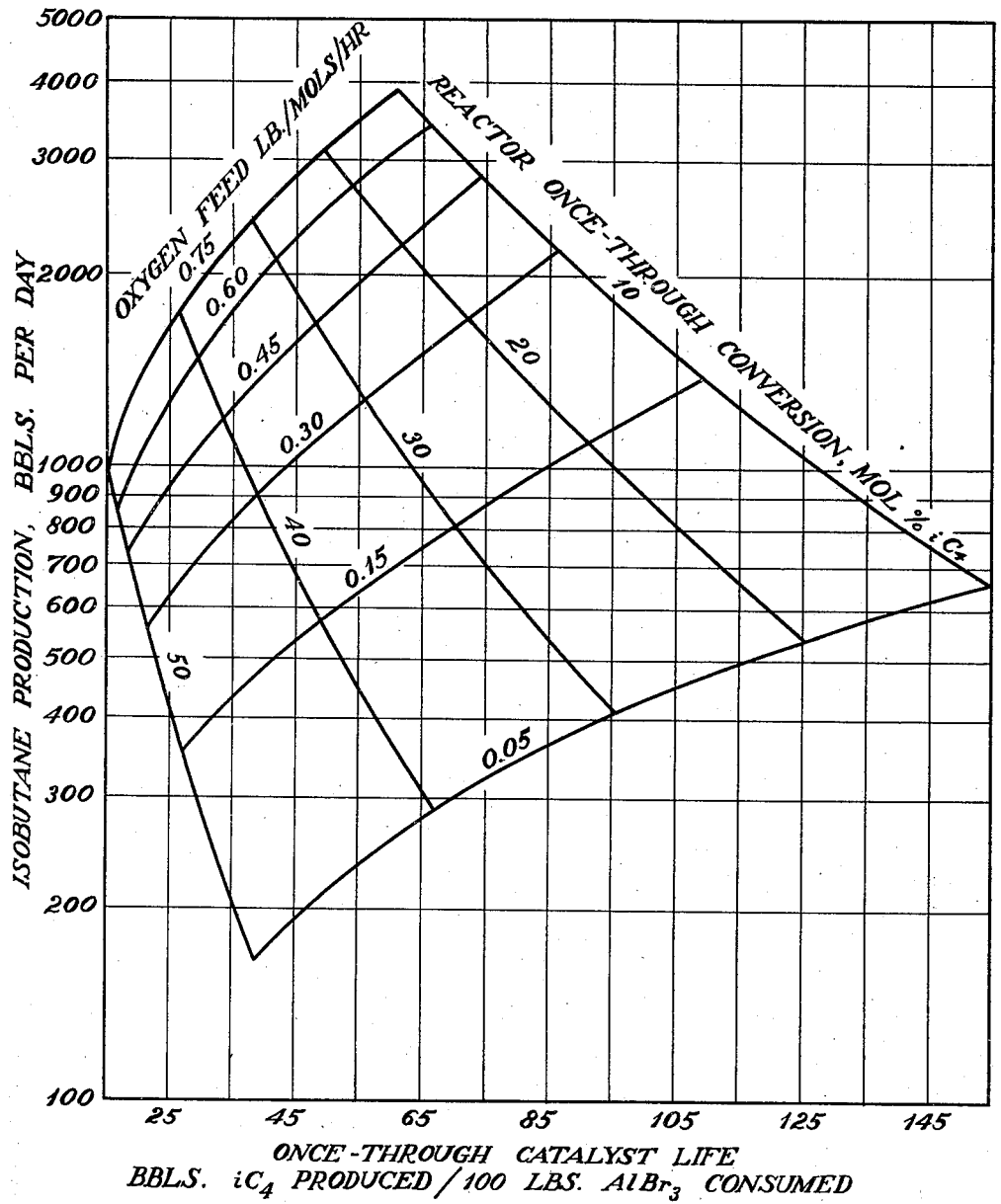

In Figure 2 is shown the effect of oxygen addition at various levels of once through conversion on isobutane production and catalyst life when operating a reactor packed with Raschig rings for a reactor having a free volume of 1000 barrels, and at a temperature of operation of 225° F., that is, within the preferred operating range. The concentration of isobutane in the reactor feed is assumed to be five mol percent and the concentration of aluminum bromide in the reaction space is within the optimum range, i. e., 2.5 mol percent. With these factors affecting conversion held constant, the isobutane production in barrels per day is plotted against once-through catalyst life expressed as barrels of isobutane produced per 100 pounds of aluminum bromide consumed, for various parameters of oxygen feed in pound mols per hour and parameters of reactor once-through conversion expressed as mol percent of isobutane produced. Thus, for example, if it is desired to produce 1000 barrels of isobutane per day by operating the above reactor under the specified conditions relative to temperature, catalyst concentration and feed composition, a once-through conversion of approximately 18 mol percent of total reactor feed to isobutane will result in the production of 100 barrels of isobutane per 100 pounds of aluminum bromide catalyst consumed. The oxygen added to maintain the required reaction rate will approximate 0.12 pound mols per hour. On the other hand, if facilities for recovering the consumed catalyst are available, I may operate the above reactor at, for example, approximately 37 mol percent conversion per pass by the addition of about 0.30 pound mols of oxygen per hour with a catalyst life of 45 barrels of isobutane per 100 pounds of aluminum bromide consumed. Higher conversion per pass results in an obvious economy in fractionation costs to recover the product isobutane, and the choice of rate of oxygen addition and throughput must be balanced against fractionation costs and catalyst recovery costs in the selection of the operating conditions actually chosen within the ranges proposed. In general the operating conditions should be selected to give a 5 to 40 mol percent, preferably a 15 to 30 mol percent, production of isobutane per pass through the reactor. Residence time will usually fall within the range of ½ to 12 hours the preferred range being 2 to 8 hours to obtain conversions within the above range.

Figure 3:
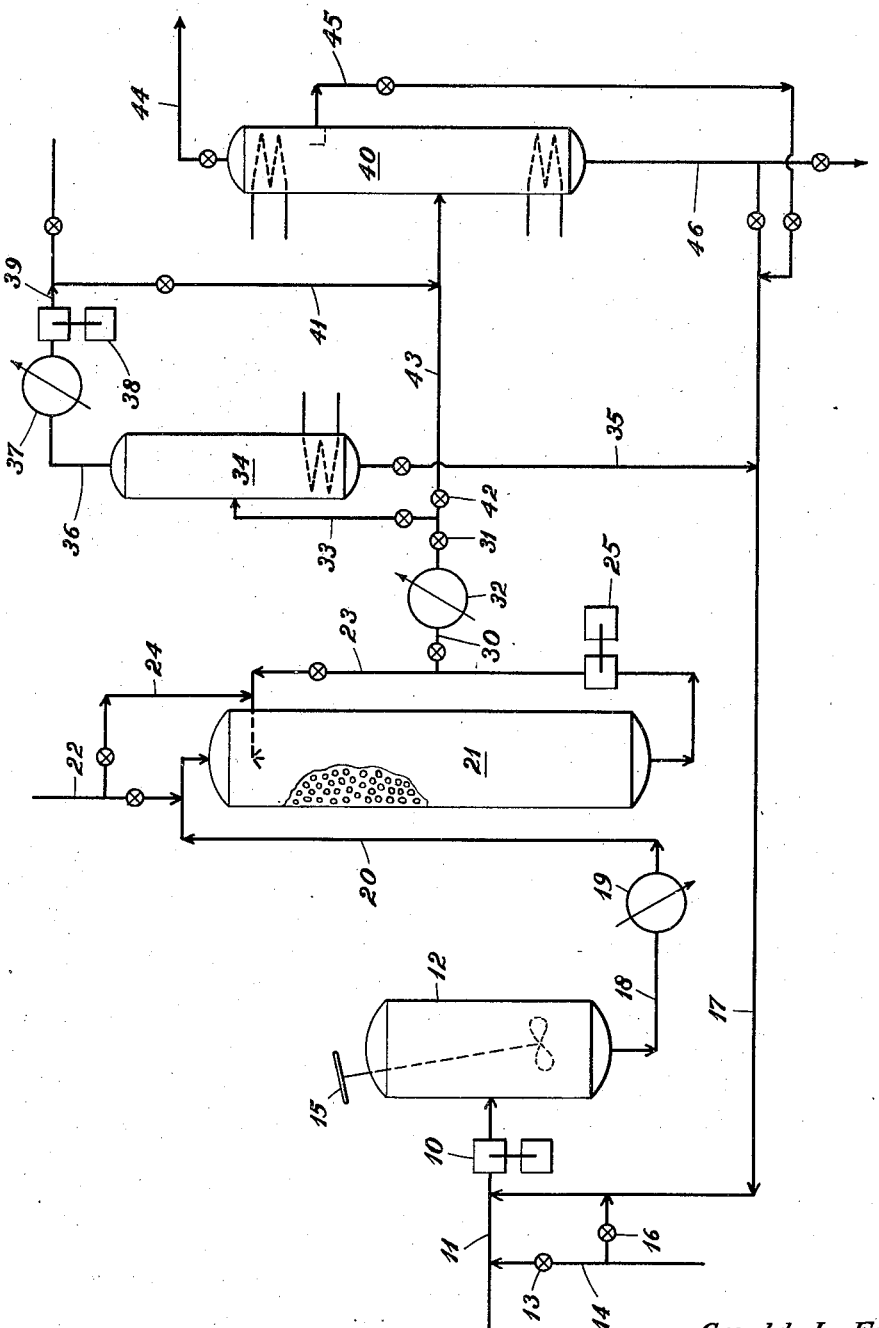

Referring now to Figure 3, wherein is shown a diagrammatic embodiment of my process, liquid normal butane or a liquid $C_4$ paraffinic hydrocarbon stream containing 70 to 100 mol percent but preferably at least 90 mol percent of normal butane is passed by means of pump 10 through line 11 to catalyst mixer 12 wherein aluminum bromide catalyst, introduced to the butane stream through valve 13 in line 14, is thoroughly mixed by means of mechanical stirrer 15 with the hydrocarbon stream to produce complete solution of the catalyst. If desired, fresh make up aluminum bromide catalyst may be introduced to the system through valved line 16 which leads from line 14 to recycle line 17. The aluminum bromide may be introduced to the system through line 14 as a hot concentrated solution in normal butane and the concentrated solution may then be diluted to the desired range of from about 2.1 mol percent to about 2.85 mol percent by the main normal butane feed stream in line 11. The normal butane stream containing an amount of aluminum bromide within this range is passed through line 18 at a pressure of from about 275 pounds to 325 pounds per square inch to heater 19 where it is raised in temperature to the range of from about 210° F. to about 240° F. whence it passes via line 20 to be introduced to reactor 21 at a point near or at the top of the tower.

Tower 21 which preferably represents a bank of multiple reactors may consist of unpacked towers provided with suitable mixing means for contacting the normal butane solution of aluminum bromide with free oxygen. Preferably the reactor system is packed with ceramic type packing such as unglazed porcelain or other inert packing material to obtain a large surface to volume ratio. As indicated hereinabove the amount of oxygen promoter required is relatively small. Assuming the free reaction space in reactor 21 to be one thousand barrels with a rated capacity of 1000 barrels production of isobutane per day at twenty percent conversion per pass, only 0.127 pound mols, i. e., approximately 4 pounds, per hour of oxygen are required to activate the dissolved aluminum bromide catalyst. Oxygen may be admitted to the reaction chamber 21 by injection to feed line 20 either continuously or intermittently from line 22 or, if desired, it may be injected directly to reactor 21 or to circulation line 23 from line 24 which joins line 22. Contact of the oxygen with liquid butane containing dissolved aluminum bromide in tower 21 is made possible by continuously withdrawing a stream of the reacting liquid mass from tower 21 through line 23 and circulating it to the top of the tower by means of pump 25. The rate of circulation for most satisfactory results may be expressed in Reynolds numbers determined on a hydraulic radius basis. Reynolds numbers of from about 500 to about 5,000 give satisfactory contact when the tower is packed with unglazed ceramic ware of high surface to volume ratio. The concentration of aluminum bromide in tower 21 is maintained at about 2.5 mol percent and with conversion at 20 percent the residence time in tower 21 will be approximately 4.8 hours.

The mixture of normal butane and isobutane is withdrawn from the reaction cycle through line 30 by operation of pressure release valve 31 and is cooled in cooler 32 to a temperature within the range of from about 145° to about 175° F. The product is then passed by valve line 33 to flash tower catalyst concentrator 34 wherein approximately 75 percent of the liquid is flashed leaving 25 percent for recycle with dissolved catalyst directly to reactor 21 through line 35 and recycle line 17.

When operating my process at relatively low conversion per pass there is very little of $C_5$ and and higher hydrocarbons formed. However, even a small conversion to these higher molecular weight hydrocarbons tends to cause their accumulation in a system wherein catalyst and unconverted normal butane are recycled to the reactor. The greater part of the small amount of $C_5$ and higher hydrocarbons flashes off with the butanes from flash tower 34, the mixed vapors passing through line 36 to condenser 37 whence the condensate is picked up by pump 38 in line 39 for transfer to storage or preferably to fractionator 40 by lines 41 and 43. In fractionator 40 isobutane product which is taken overhead through line 44, is separated from normal butane and any higher boiling hydrocarbons. Normal butane is withdrawn for recycle to tower 21 as a sidestream through line 45 which connects with recycle line 17 and the higher boiling hydrocarbons, if any, are withdrawn through line 46. If no hydrocarbons boiling higher than the butanes are formed, normal butane may be withdrawn as the bottom product for recycle through line 46 which also connects with recycle line 17. When operating in this manner, flash tower concentrator 34 may be by-passed by closing the valve in line 33 and opening valve 42 in line 43. Thus, assuming no production of $C_5$ and higher hydrocarbons, and the capacity of the hereinabove described unit to be 1000 barrels per day of 100 percent isobutane from 1000 barrels per day of 100 percent normal butane feed, and a reactor system 21 containing 1000 barrels of free reaction space, the following quantities of butanes per hour will be handled in operating with valve 42 open and the concentrator by-passed. Through feed pump 10 will flow 41⅔ barrels of fresh normal butane and 166⅔ barrels of recycle normal butane, the total of 208⅓ barrels being subjected to a residence time of 4.8 hours in reactor 21. 166⅔ barrels per hour of normal butane recycle with dissolved aluminum bromide catalyst will be handled as the bottom drawoff from fractionator 40 through line 46, and 41⅔ barrels of isobutane per hour will be recovered as overhead product through line 44, from the 208⅓ barrels of product per hour being sent to fractionator 40. If, on the other hand, $C_5$ and higher hydrocarbons are produced, accumulation of these products may be substantially prevented by flashing the product in catalyst concentrator 34 in which case as a result of the partial recycle of isobutane product, the load on pump 10 will be increased from 208⅓ barrels per hour to approximately 222 barrels per hour assuming a flash separation in concentrator 34 of seventy-five percent of the liquid product as overhead. If concentrator 34 is eliminated entirely, normal butane recycle may be withdrawn from tower 40 through line 45 and the bottom fraction from tower 40 comprising $C_5$ and higher hydrocarbons may be subjected to fractionation in a separate tower for separation of the aluminum bromide catalyst for these higher boiling hydrocarbons, aluminum bromide being recycled independent of the normal butane recycle stream.

Although I have described my invention as applicable to a continuous process wherein the isomerization is carried out in a packed tower, I do not wish to be limited to this type of reactor or to continuous operation. Reactors containing no packing may be used if means for producing intimate contact of the normal butane solution of aluminum bromide catalyst with the oxygen activator is provided. Optimum catalyst concentration is applicable to non-packed reactor continuous operation as well as to batch type operation.

I claim:

1. In a process for the conversion of liquid normal butane to isobutane in a reaction zone wherein said normal butane is maintained in intimate contact with an aluminum bromide catalyst promoted by free oxygen the improvement which comprises maintaining in solution in said butane and isobutane a concentration of aluminum bromide greater than 2.1 mol percent and not greater than 2.85 mol percent of said solution and maintaining said solution at a temperature within the range of from about 210° F. to about 240° F.

2. In a continuous process for increasing the isobutane content of a liquid predominantly normal butane stream wherein aluminum bromide catalyst is added to said liquid stream and wherein said aluminum bromide containing stream is maintained in intimate contact with free oxygen in a pocked tower reactor whereby said aluminum bromide is activated while in contact with said liquid stream the improvement which comprises dissolving said aluminum bromide in said predominantly normal butane stream in amounts such that the aluminum bromide in solution in said butanes in said packed tower reactor is maintained at a concentration greater than 2.1 mol percent and not greater than 2.85 mol percent of said solution and maintaining said solution at a temperature within the range of from about 210° F. to about 240° F.

3. The process of converting normal butane to isobutane comprising the steps of (1) dissolving aluminum bromide in a liquid normal butane stream, (2) passing said liquid normal butane through a packed reactor wherein the temperature is maintained within the range of from about 210° F. to about 240° F. and maintaining the pressure in said packed reactor sufficiently high to maintain the normal butane in the liquid phase, (3) continuously passing an oxygen containing gas in intimate contact with said normal butane and said aluminum bromide in said packed reactor, and (4) regulating the amount of aluminum bromide dissolved in step 1 to maintain aluminum bromide in the solution in said packed reactor at a concentration greater than 2.1 mol percent and not greater than 2.85 mol percent of said solution.

4. The process of claim 3 wherein the amount of oxygen added to the reactor is within the range of from about 0.005 to 0.20 pound mols per hour per thousand barrels of free reaction space.

5. The process of claim 3 wherein the oxygen containing gas of step 4 is selected from the class consisting of air and commercial oxygen gas.

6. The process of claim 3 wherein the packed reactor is substantially completely filled with an inert ceramic packing material.

7. The process for the isomerization of normal butane to isobutane which comprises introducing normal butane into a reaction zone containing a solution of aluminum bromide in an essentially four carbon atom paraffinic hydrocarbon solvent, maintaining a temperature of between 210° F. and about 240° F. and a pressure at least sufficient to maintain the normal butane in the liquid phase at the reaction temperature in said reaction zone, introducing free oxygen into said reaction zone to promote the isomerization reaction, withdrawing four carbon atom paraffin hydrocarbons including isobutane product from said reaction zone, and introducing aluminum bromide to said reaction zone at a rate so as to maintain aluminum bromide dissolved in the paraffin hydrocarbons at a concentration greater than 2.1 mol percent and not greater than 2.85 mol percent of said solution.

8. The process of claim 7 wherein the amount of oxygen introduced to the reaction zone is within the range of from about 0.005 to 0.20 pound mols per hour per housand barrels of free reaction space.

9. A continuous process for the isomerization of normal butane to isobutane which comprises introducing a normal butane containing hydrocarbon stream into a reaction zone containing a solution of aluminum bromide in an essentially four carbon atom paraffinic hydrocarbon solvent, maintaining in said reaction zone a temperature within the range of from about 210° F. to about 240° F. and a pressure at least sufficient to maintain the normal butane in liquid phase at the reaction temperature in said reaction zone, introducing free oxygen into said reaction zone in an amount within the range of from about 0.005 to about 0.2 pound mols per hour per 1000 barrels of free reaction space in said reactor to promote the isomerization reaction, withdrawing four carbon atom paraffin hydrocarbons including isobutane from said reaction zone, introducing aluminum bromide to said reaction zone at a rate so as to maintain a concentration of aluminum bromide in solution in the paraffinic hydrocarbon solvent equivalent to about 2.5 mol percent of the aluminum bromide solution in said reaction zone and recovering isobutane from said four carbon atom paraffin hydrocarbons withdrawn from said reaction zone.

GERALD L. FARRAR.

REFERENCES CITED

The following references are of record in the file of this patent:

UNITED STATES PATENTS

| Number | Name | Date |
| --- | --- | --- |
| 2,271,860 | Goldsby | Feb. 3, 1942 |
| 2,341,286 | Pines et al. | Feb. 8, 1944 |
| 2,342,124 | Danforth | Feb. 22, 1944 |
| 2,343,406 | Dryer | Mar. 7, 1944 |
| 2,346,768 | Laughlin | Apr. 18, 1944 |
| 2,278,934 | Lee | Apr. 7, 1942 |
| 2,288,477 | Montgomery | June 30, 1942 |

FOREIGN PATENTS

| Number | Country | Date |
| --- | --- | --- |
| 512,408 | Great Britain | Sept. 1, 1939 |

OTHER REFERENCES

Leighton et al., article in Jour. Amer. Chem. Soc., vol. 65; Dec. 1943; pages 2276 to 2280.

Glasebrook et al., Jour. Am. Chem. Soc., vol. 58, 1944–8 (1936). (Pat. Off. Lib.)